United States Patent
Liu et al.

(10) Patent No.: US 9,214,772 B2
(45) Date of Patent: Dec. 15, 2015

(54) APPARATUS HAVING A TRAY WITH TWO PERPENDICULAR GROOVES FOR HOLDING TWO MEMORY CARDS

(71) Applicant: HUAWEI DEVICE CO., LTD., Shenzhen (CN)

(72) Inventors: Xuelong Liu, Shanghai (CN); Huimin Zhang, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/553,268

(22) Filed: Nov. 25, 2014

(65) Prior Publication Data

US 2015/0079847 A1 Mar. 19, 2015

Related U.S. Application Data

(63) Continuation of application No. PCT/CN2014/080929, filed on Jun. 27, 2014.

(30) Foreign Application Priority Data

Jun. 28, 2013 (CN) .......................... 2013 1 0268826

(51) Int. Cl.
*H01R 12/72* (2011.01)
*H01R 27/00* (2006.01)
(Continued)

(52) U.S. Cl.
CPC ..... *H01R 27/00* (2013.01); *G06F 1/00* (2013.01); *G06K 7/00* (2013.01); *G06K 7/0043* (2013.01); *G06K 13/0831* (2013.01); *H01R 12/721* (2013.01); *H01R 12/737* (2013.01)

(58) Field of Classification Search
CPC ........ H01R 24/00; H01R 27/00; H01R 12/72; H01R 12/721; H01R 12/737; H01R 23/70; H01R 23/7068; H01R 23/725; H01R 23/6886
USPC .................................................. 439/630–632
See application file for complete search history.

(56) References Cited

U.S. PATENT DOCUMENTS 6,802,742 B2 * 10/2004 Chaillie ................. G06K 13/08
439/325
7,381,094 B2 * 6/2008 Miyao .................... G06K 13/08
439/630
(Continued)

FOREIGN PATENT DOCUMENTS

CN 2686119 3/2005
CN 101593885 12/2009
(Continued)

OTHER PUBLICATIONS

PCT International Search Report dated Sep. 19, 2014 in corresponding International Patent Application No. PCT/CN2014/080929.
(Continued)

*Primary Examiner* — Chandrika Prasad
(74) *Attorney, Agent, or Firm* — Staas & Halsey LLP

(57) ABSTRACT

The present invention disclose an apparatus for fastening a digital memory card, including a tray and a card holder, where the tray includes a first groove, configured to accommodate a first digital memory card; and a second groove, disposed perpendicular to the first groove and configured to accommodate a second digital memory card, where the first groove and the second groove have hollowed portions that partially overlap; and the card holder includes a first spring and a second spring, where when the tray is inserted into the card holder, the first spring and the second spring extrude from the hollowed portions. According to the present invention, an apparatus for fastening a digital memory card, which is compatible with a SIM card and an SD card, is implemented, thereby flexibly meeting user requirements of using different cards by using an apparatus for fastening a digital memory card without increasing layout space.

10 Claims, 5 Drawing Sheets

(51) Int. Cl.
*H01R 12/73* (2011.01)
*G06F 1/00* (2006.01)
*G06K 7/00* (2006.01)
*G06K 13/08* (2006.01)

(56) References Cited

U.S. PATENT DOCUMENTS

| 8,109,794 B2* | 2/2012 | Tanaka | H01R 12/57 |
| | | | 439/630 |
| 8,251,720 B2* | 8/2012 | Yu | H01R 13/62 |
| | | | 439/159 |
| 2004/0110423 A1* | 6/2004 | Shishikura | G06K 7/0021 |
| | | | 439/630 |

FOREIGN PATENT DOCUMENTS

| CN | 201436711 | 4/2010 |
| CN | 102510416 | 6/2012 |
| CN | 102856744 | 1/2013 |
| CN | 102946026 | 2/2013 |
| CN | 203071270 | 7/2013 |
| CN | 103296518 | 9/2013 |
| CN | 103367951 | 10/2013 |
| EP | 2000946 A1 | 12/2008 |
| EP | 2026241 A2 | 2/2009 |

OTHER PUBLICATIONS

"Smart Cards; UICC-Terminal interface; Physical and logical characteristics (Release 11)", ETSI TS 102 221, V11.0.0, Jun. 2012, pp. 1-181.

Extended European Search Report dated Jun. 12, 2015 in corresponding European Patent Application No. 14787084.4.

Chinese Office Action dated Feb. 4, 2015 in corresponding Chinese Patent Application No. 201310268826.1.

* cited by examiner

APPARATUS HAVING A TRAY WITH TWO PERPENDICULAR GROOVES FOR HOLDING TWO MEMORY CARDS

CROSS-REFERENCE TO RELATED APPLICATION

This application is a continuation of International Application No. PCT/CN2014/080929, filed on Jun. 27, 2014, which claims priority to Chinese Patent Application No. 201310268826.1, filed on Jun. 28, 2013, both of which are hereby incorporated by reference in their entireties.

TECHNICAL FIELD

The present invention relates to the field of mobile communications technologies, and in particular, to an apparatus for fastening a digital memory card, which is compatible with a SIM card and an SD card.

BACKGROUND

A design proposal put forward by Apple for a Nano SIM card is chosen by the European Telecommunications Standards Institute (ETSI), while a proposal put forward jointly by Nokia, RIM and Motorola fails to be chosen. The ETSI announced the news at its official website, and stated that an agreement has been reached on a universal integrated circuit card (UICC) at the Smart Card Platform Technical Committee meeting held in Osaka, Japan. The Institute said that specifications (12.3 millimeters wide, 8.8 millimeters high, and 0.67 millimeters thick) of a Nano SIM card of Apple are 40% smaller than specifications of existing Micro SIM card. The final design solution will be formulated in a manner that ensures it is backward compatible with an existing SIM card, and will continue to offer the same functions as SIM cards we use today. The specifications of a Nano SIM card of Apple have been adopted by the industry, and various mobile network operators, smart card providers, and mobile device manufactures all get involved. With ascertainment of Nano SIM card standards, a design adaptive to a card holder of a Nano SIM card will also emerge. Regarding wide application of existing Micro SIM cards, more designs for two subscriber identity modules will emerge in terms of design layouts of mobile terminals, so as to achieve compatibility with a Micro SIM card and a Nano SIM card. However, a common user may use only one SIM card. Therefore, when a user uses only a Micro SIM card, space of a card holder of a Nano SIM card is wasted, and the Nano SIM card holder cannot be extended for another application. Therefore, it can be considered to extend compatibility of a card holder of a Nano SIM card, for example, compatibility with an SD card, to improve applicability of a terminal. However, in an existing solution, a two-in-one card holder for a SIM card and an SD card generally uses a laminated structure, and the two cards are separately corresponding to different card slots. As a result, the laminated structure may cause the height of the card holder to be excessively large and a board occupation area is large. On that account, a design solution to a card holder that can be compatible with a Nano SIM card and an SD card is required, so as to meet a requirement that a user can select to use a Nano SIM card or an SD card in different situations.

SUMMARY

Embodiments of the present invention provide an apparatus for fastening a digital memory card, which is compatible with a SIM card and an SD card, so as to meet user requirements of using different cards without increasing layout space.

According to a first aspect, an embodiment of the present invention provides an apparatus for fastening a digital memory card, where the apparatus includes a tray and a card holder, where the tray includes: a first groove, configured to accommodate a first digital memory card; and a second groove, disposed perpendicular to the first groove and configured to accommodate a second digital memory card, where the first groove and the second groove have hollowed portions that partially overlap; and the card holder includes: a first spring and a second spring, where when the tray is inserted into the card holder, the first spring and the second spring extrude from the hollowed portions; when the first digital memory card is accommodated in the first groove, the first spring is in contact with a metal contact of the first digital memory card; and when the second digital memory card is accommodated in the second groove, the second spring is in contact with a metal contact of the second digital memory card.

In a first possible implementation manner, the tray further includes an insert end and an outer end; the card holder further includes an insert plane, and is configured to insert the insert end of the tray into the card holder from the insert plane; and when the tray is accommodated in the card holder, the outer end overlapped with the insert plane.

With reference to the first aspect or the first possible implementation manner of the first aspect, in a second possible implementation manner, the tray further includes a step structure, which is disposed on a tray side between the first groove and the insert end.

With reference to the first aspect or the first possible implementation manner of the first aspect, in a third possible implementation manner, there are multiple second springs, which are perpendicular to a direction of the insert end of the tray and arranged on a peer end of the insert plane in a single-sided manner.

With reference to the first aspect or the third possible implementation manner of the first aspect, in a fourth possible implementation manner, the second spring includes a second fastening spring pin, which is configured to fasten the second spring on the card holder and is welded with an external circuit board.

With reference to the first aspect or the second possible implementation manner of the first aspect, in a fifth possible implementation manner, there are multiple first springs, which are set between the second spring and the insert plane, are parallel to a direction in which the tray is inserted, and are symmetrically arranged on two sides of the card holder.

With reference to the first aspect or the fifth possible implementation manner of the first aspect, in a sixth possible implementation manner, the first spring includes a first fastening spring pin, which is configured to fasten the first spring on the card holder and is welded with an external circuit board.

In a seventh possible implementation manner, the card holder further includes a limit spring pin, and the tray further includes tray limit; and when the tray is inserted into the card holder, the limit spring pin cooperates with the tray limit to fasten the tray on the card holder.

With reference to the first aspect or the second possible implementation manner of the first aspect, in an eighth possible implementation manner, the card holder further includes a detection pin, which is disposed on one side of the second spring, corresponding to a position of the step structure, and is configured to detect whether the first digital memory card or the second digital memory card exists in the apparatus for fastening a digital memory card.

In a ninth possible implementation manner, the first digital memory card is a Nano SIM card, and the second digital memory card is a Micro SD card.

According to the apparatus for fastening a digital memory card provided in the embodiments of the present invention, a board occupation area of the fastening apparatus can be minimized on the condition that valid contact can be implemented by perpendicularly setting a position of a Nano SIM card and a Micro SD card, thereby meeting user requirements for using different cards by using an apparatus for fastening a digital memory card without increasing layout space.

The following further describes the technical solutions of the present invention in detail with reference to the accompanying drawings and embodiments.

DESCRIPTION OF EMBODIMENTS

Figure 1:
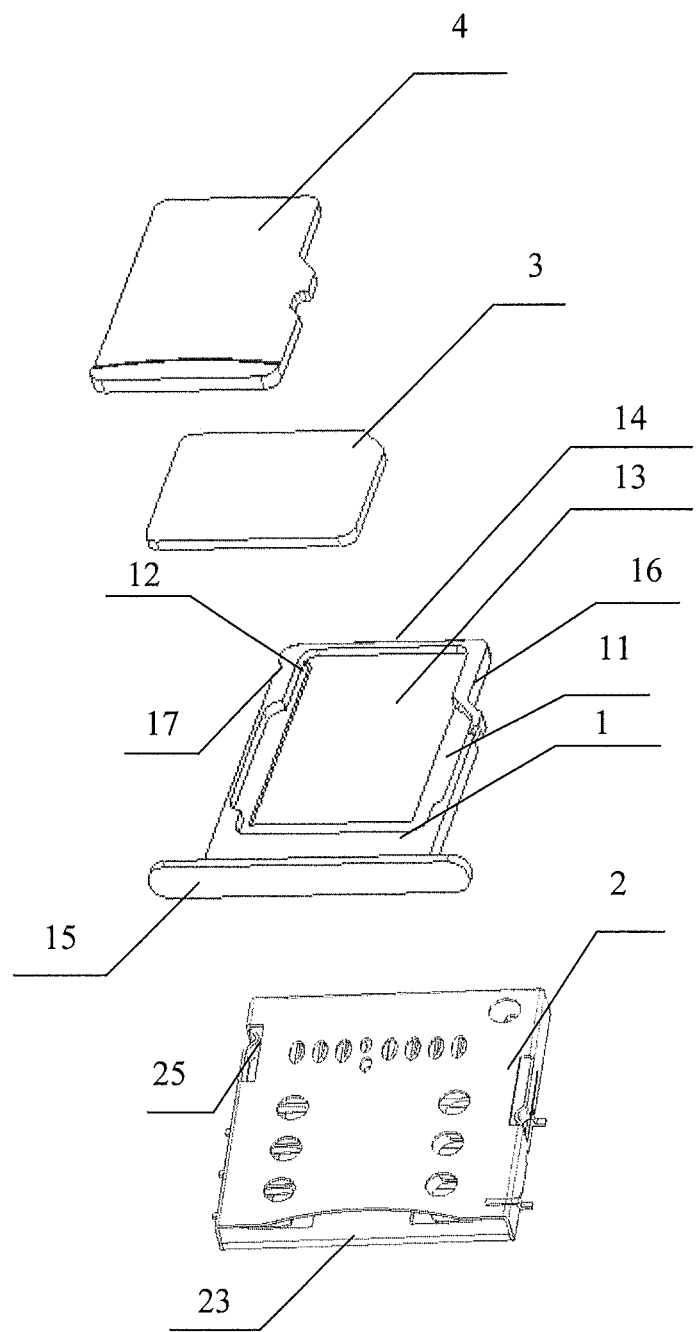
FIG. 1 is a schematic exploded view of an apparatus for fastening a digital memory card according to an embodiment of the present invention.
Figure 2:
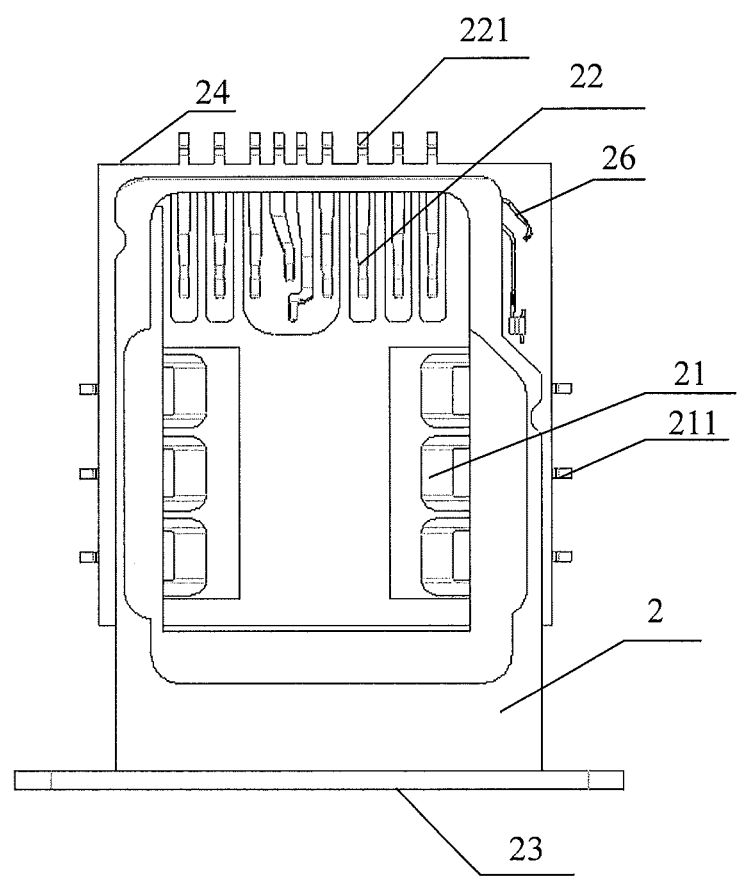
FIG. 2 is a perspective view of an apparatus for fastening a digital memory card according to an embodiment of the present invention.

An apparatus for fastening a digital memory card according to embodiments of the present invention is described in detail with reference to FIG. 1 and FIG. 2 as follows: FIG. 1 is a schematic exploded view of an apparatus for fastening a digital memory card according to Embodiment 1 of the present invention, and FIG. 2 is a perspective view of an apparatus for fastening a digital memory card according to an embodiment of the present invention.

As shown in FIG. 1, an apparatus for fastening a digital memory card includes a tray 1 and a card holder 2, where the apparatus for fastening a digital memory card is configured to accommodate a first digital memory card 3 or a second digital memory card 4. Preferably, the first digital memory card 3 is a SIM card, and the second digital memory card 4 is an SD card.

Specifically, the tray 1 includes a first groove 11 configured to accommodate the first digital memory card 3, and a second groove 12 configured to accommodate the second digital memory card 4, where the second groove 12 and the first groove 11 are disposed in a perpendicular manner, a groove depth of the first groove 11 is the same as that of the second groove 12, and the first groove 11 and the second groove 12 are in a same plane. Therefore, a position of the first digital memory card 3 in the tray 1 is perpendicular to a position of the second digital memory card 4 in the tray 1. The first groove 11 and the second groove 12 have hollowed portions 13 that partially overlap.

Further, the tray 1 further includes an insert end 14 and an outer end 15, and the card holder 2 further includes an insert plane 23.

Still further, the outer end 15 is a baffle, perpendicular to a plane on which the first groove 11 and the second groove 12 is located, and both a size and a shape of the outer end 15 are the same as those of the insert plane 23.

When the tray 1 and the card holder 2 are assembled, the insert end 14 is first inserted into the card holder from the insert plane 23 of the card holder 23. When the tray 1 is completely inserted into the card holder 2, the outer end 15 overlapped with the insert plane 23, forming an outer surface, in a cuboid shape, of the apparatus for fastening a digital memory card after assembly of the tray 1 and the card holder 2 is completed.

Further, the tray 1 further includes a step structure 16, which is located on one side of the tray 1 between the first groove 11 and the insert end 14, where a width of the tray at the step structure 16 is smaller than a width of the tray at a non-step structure.

As shown in FIG. 2, the card holder 2 includes a first spring 21 and a second spring 22.

With reference to FIG. 1 and FIG. 2, when the tray 1 is inserted into the card holder 2, the first spring 21 and the second spring 22 extrude from the hollowed portions 13; when the first digital memory card 3 is accommodated in the first groove 11, the first spring 21 is in contact with a metal contact (not shown in the figure) of the first digital memory card 3; and when the second digital memory card 4 is accommodated in the second groove 12, the second spring 22 is in contact with a metal contact (not shown in the figure) of the second digital memory card 4.

Further, there are multiple first springs 21, which are disposed between the second spring 22 and the insert plane 23, are parallel to a direction in which the tray 1 is inserted, and are symmetrically arranged on two sides of the card holder 2. Preferably, the first spring 21 is of an elastic arc structure, with a middle part protruding upward, and is configured to be in contact with the metal contact of the first digital memory card 3.

Still further, the first spring 21 includes a first fastening spring pin 211, which is configured to fasten the first spring 21 on the card holder 2 and is welded with an external circuit board.

Further, there are multiple second springs 22, which are perpendicular to a direction of the insert end of the tray 1 and arranged on a peer end 24 of the insert plane 23 in a single-sided manner. Preferably, the second spring 22 is of an elastic arc structure, with a middle part protruding upward, and is configured to be in contact with the metal contact of the second digital memory card 4.

Still further, the second spring 22 includes a second fastening spring pin 221, which is configured to fasten the second spring 22 on the card holder 2 and is welded with an external circuit board.

Further, the card holder 2 further includes a limit spring pin 25, and the tray 1 further includes tray limit 17; and when the tray 1 is inserted into the card holder 2, the limit spring pin 25 cooperates with the tray limit 17 to fasten the tray 1 on the card holder 2.

Preferably, the card holder 2 further includes a detection pin 26, which is disposed on one side of the second spring 22, and is configured to detect whether the first digital memory card 3 or the second digital memory card 4 exists in the apparatus for fastening a digital memory card. Specifically, the detection pin 26 is separately connected, inside the card holder 2, to one spring in the first spring 21 and one spring in the second spring 22. When the first digital memory card 3 is inserted into the card holder 2, a metal contact (not shown in the figure) of the first digital memory card 3 is electrically connected to the detection pin 26 by using the first spring 21, and a metal contact (not shown in the figure) of the second digital memory card 4 is electrically connected to the detection pin 26 by using the second spring 22. Whether the first digital memory card 3 or the second digital memory card 4 exists is detected by using an electrical signal, received by the detection pin 26, of a metal contact. A position of the detection pin 26 in the card holder 2 is corresponding to a position of the step structure 16 of the tray 1, so that the detection pin 26 can extrude from the step structure 16 without being blocked by the card holder 2 when the tray 1 is disposed in the card holder 2. A function of detecting a card can be implemented without increasing a board occupation area additionally by placing the detection pin 26 in a position of the step structure 16.

When the tray 1 holds the first digital memory card 3 and is inserted into the card holder 2, multiple metal contacts (not shown in the diagram) of the first digital memory card 3 are separately in contact with multiple first springs 21 of the card holder 2. The first spring 21 has elasticity, and presses the first digital memory card 3 closely to an internal wall of the card holder by elastic contact, so that the first digital memory card 3 is fastened on the apparatus for fastening a digital memory card, and is connected to the external circuit board by using the first fastening spring pin 211 of the first spring 21, so as to implement a corresponding function of the first digital memory card 3.

When the tray 1 holds the second digital memory card 4 and is inserted into the card holder 2, multiple metal contacts (not shown in the figure) of the second digital memory card 4 are separately in contact with multiple second springs 22 of the card holder 2. The second spring 22 has elasticity, through which the second digital memory card 4 is fastened on the apparatus for fastening a digital memory card. The second digital memory card 4 is connected to the external circuit board by using the second fastening spring pin 221 of the second spring 22, so as to implement a corresponding function of the second digital memory card 4.

In the apparatus for fastening a digital memory card provided in Embodiment 1 of the present invention, a first groove and a second groove are perpendicularly disposed on a tray, and correspondingly, a first spring and a second spring are perpendicularly disposed in a card slot, so that the apparatus for fastening a digital memory card is effectively compatible with two digital memory cards, namely a SIM card and an SD card in a case of a minimum board occupation area and a minimum height, so as to flexibly meet user requirements of using different cards. The apparatus for fastening a digital memory card provided in the embodiment of the present invention is particularly applicable to a terminal device with two subscriber identity modules.

For a new-generation SIM card of mobile phones, namely, a Nano SIM card, the apparatus for fastening a digital memory card provided in the foregoing embodiment of the present invention, based on a size of an existing SD card, is particularly applicable to achieve compatibility with a Micro SD card and a Nano SIM card. In addition, the apparatus for fastening a digital memory card provided in the foregoing embodiment of the present invention is also applicable to achieve compatibility with a Micro SIM card and a Micro SD card, or achieve compatibility with other digital memory cards of similar thickness and sizes.

Sizes of a Micro SD card, a Nano SIM card and a Micro SIM card are shown in Table 1.

TABLE 1

| Digital memory card | Length (mm) | Width (mm) | Thickness (mm) |
| --- | --- | --- | --- |
| Micro SD | 15 | 11 | 0.7 |
| Nano SIM | 12.3 | 8.8 | 0.67 |
| Micro SIM | 15 | 12 | 0.76 |

It can be known according to Table 1 that, a width of a Micro SD card is quite close to a length of a Nano SIM card, and a thickness of the Micro SD card is also very close to a thickness of the Nano SIM card. Therefore, the size is particularly applicable to the solution to disposing digital memory cards in a perpendicular manner provided in the foregoing embodiment of the present invention. Compatibility with two subscriber identity modules can be implemented in a case of a minimum board occupation area by fully utilizing the size characteristics of the two cards.

Based on the apparatus for fastening a digital memory card in Embodiment 1 of the present invention and with reference to FIG. 3 to FIG. 6, the following uses a specific embodiment to describe an apparatus for fastening a digital memory card, which is compatible with a Micro SD card and a Nano SIM card. To make description clearer, it is specified that, in the schematic diagrams related to this embodiment, that a direction for placing a plane with a metal contact of a digital memory card (a Micro SD card and Nano SIM card) serves as an underside and an outer end serves as a front side is used as a reference direction. Upper, middle, lower, left and right diagrams shown in FIG. 3 to FIG. 6 are respectively a front view, a side view, a rear view, a bottom view, and a top view.

Figure 3:
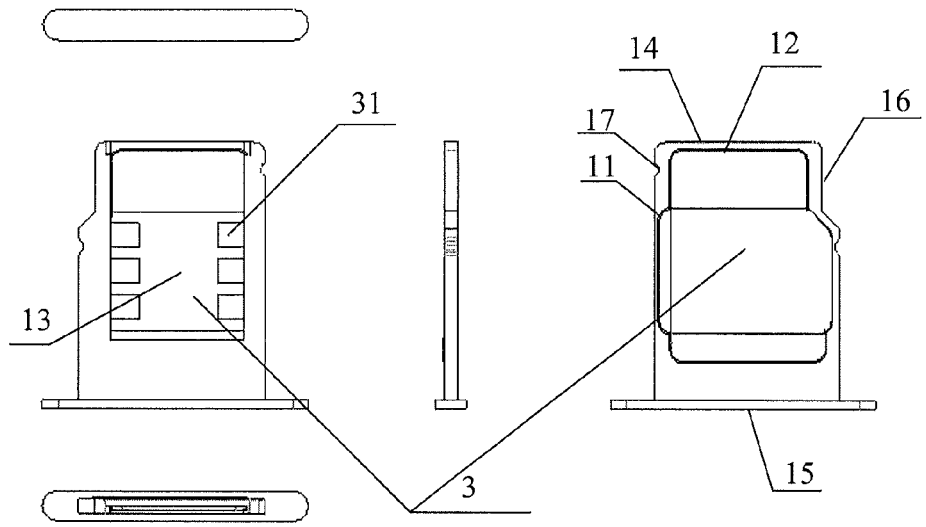
FIG. 3 is a schematic diagram of a tray when a Nano SIM card is accommodated, according to an embodiment of the present invention.

FIG. 3 is a schematic diagram of a tray when a Nano SIM card is accommodated. As shown in the figure, a Nano SIM card 3 is accommodated in a first groove 11 of a tray 1, where a shape and a size of the first groove 11 match a shape and a size of the Nano SIM card 3. Six metal contacts 31 of the Nano SIM card 3 extrude from a hollowed portion 13 between the first groove 11 and a second groove 12.

Figure 4:
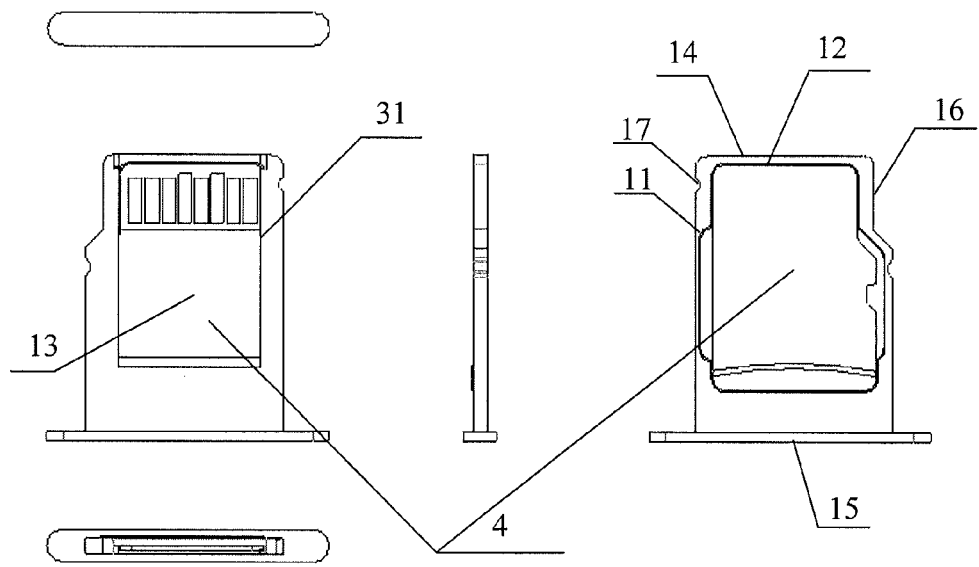
FIG. 4 is a schematic diagram of a tray when a Micro SD card is accommodated, according to an embodiment of the present invention.

FIG. 4 is a schematic diagram of a tray when a Micro SD card is accommodated. As shown in the figure, a Micro SD card 4 is accommodated in a second groove 12 of a tray 1, where a shape and a size of the second groove 12 match a shape and a size of the Micro SD card 4. Eight metal contacts 41 of the Micro SD card 4 extrude from a hollowed portion 13 between a first groove 11 and the second groove 12.

The tray 1 also has a tray limit 17 on the left side of in the second groove 12, and also has a step structure 16 on the right side of the tray 1. In addition, the tray 1 also includes an insert end 14 and an outer end 15. The foregoing parts are all described in detail in Embodiment 1, and are not repeatedly described herein.

Figure 5:
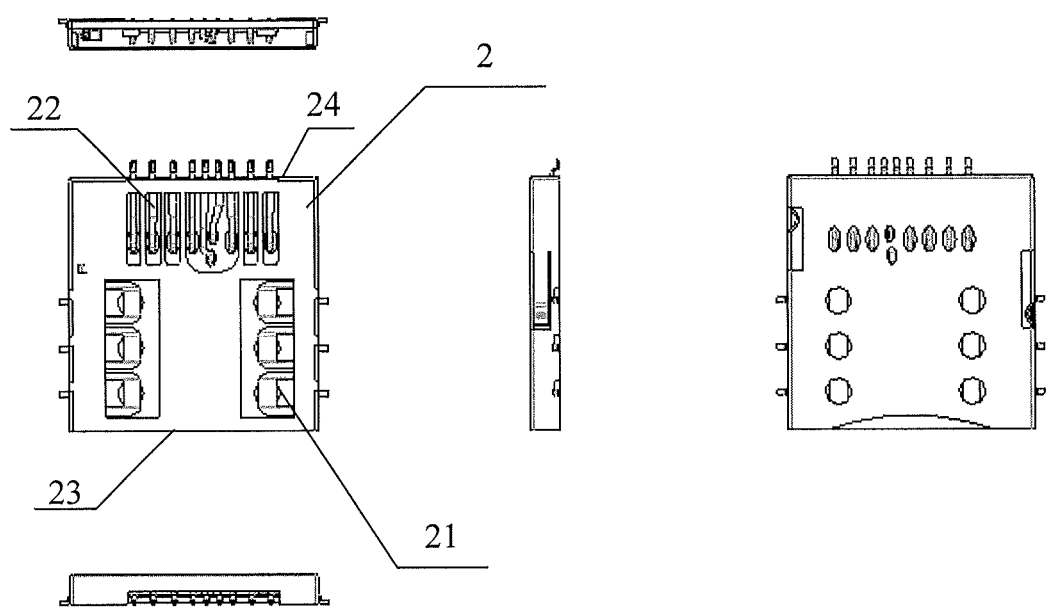
FIG. 5 is a schematic diagram of a card holder according to an embodiment of the present invention.

FIG. 5 is a schematic diagram of a card holder. As shown in the figure, a card holder 2 includes a first spring 21, a second spring 22, an insert plane 23, a peer end 24, a limit spring pin (not shown in the figure), and a detection pin (not shown in the figure). The foregoing parts are all described in detail in Embodiment 1, and are not repeatedly described herein. The number of the first springs 21 is 6, and the number of the second springs 22 is 9.

Figure 6:
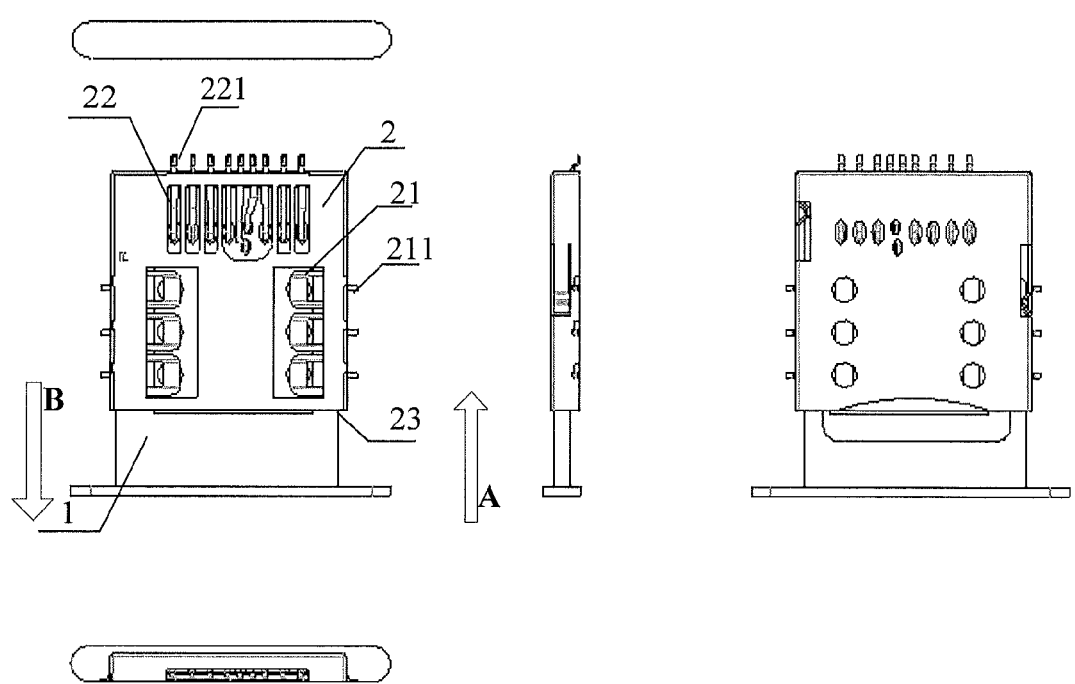
FIG. 6 is a schematic diagram of an apparatus for fastening a digital memory card when it is closed/opened, according to an embodiment of the present invention.

FIG. 6 is a schematic diagram of an apparatus for fastening a digital memory card when it is closed/opened. As shown in the figure:

During insertion of a tray 1 accommodated with a Nano SIM card (not shown in the figure) or a Micro SD card (not shown in the figure) into a card holder 2, the tray 1 is inserted into the card holder 2 from the insert plane 23 in a direction A shown in the figure. When the tray 1 is completely inserted into the card holder 2, that is, when the apparatus for fastening a digital memory card is closed, six metal contacts (not shown in the figure) of a Nano SIM card are separately in contact with six first springs 21 of the card holder 2; the first springs 21 have elasticity, through which the Nano SIM card is fastened on the apparatus for fastening a digital memory card; the Nano SIM card is connected to an external circuit board by using a first fastening spring pin 211 of the first springs 21; in this way, a terminal device installed with the Nano SIM card can implement functions such as communication by using the Nano SIM card. Alternatively, eight metal contacts (not shown in the figure) of a Micro SD card are separately in contact with nine second springs 22 of the card holder 2, and a fourth metal spring on a right side of the metal contact (not shown in the figure) of the Micro SD card is in contact with a fourth spring and a fifth spring on the right side of the second springs 22; the second springs 22 have elasticity, through which the Micro SD card is fastened on the apparatus for fastening a digital memory card; the Micro SD card is connected to an external circuit board by using a second fastening spring pin 221 of the second springs 22; in this way, a terminal device installed with the Micro SD card can expand storage space by using the Micro SD card.

When the apparatus for fastening a digital memory card is opened, the tray 1 accommodated with a Nano SIM card (not shown in the figure) or a Micro SD card (not shown in the figure) is removed or ejected from the card holder 2 in a direction B shown in the figure. Both the first spring 21 and the second spring 22 are elastic arc structures; therefore, in a process of removing or ejecting the tray 1, it can be avoided that the tray 1 hangs on a metal contact of the Nano SIM card or the Micro SD card. A specific manner for moving a tray may be a push-pull (Push-Pull) manner or a push-push (Push-Push) manner.

In the embodiment of the present invention, by utilizing a characteristic that a width of a Micro SD card is quite close to a length of a Nano SIM card and a thickness of the Micro SD card is also very close to a thickness of the Nano SIM card, and by setting a position of a Nano SIM card to be perpendicular to a position of a Micro SD card, an apparatus for fastening a digital memory card, which is compatible with a Micro SD card and a Nano SIM card, is provided, which minimizes a board occupation area of the fastening apparatus on the condition that valid contact can be implemented. In this way, user requirements of using different cards can be flexibly met by using an apparatus for fastening a digital memory card without increasing layout space.

The foregoing specific embodiments further describe the objective, technical solutions, and beneficial effects of the present invention in detail. It should be understood that the foregoing descriptions are merely specific implementation manners of the present invention, but are not intended to limit the protection scope of the present invention. Any modification, equivalent replacement, or improvement made without departing from the spirit and principle of the present invention shall fall within the protection scope of the present invention.

What is claimed is:

1. An apparatus for fastening a digital memory card, comprising:
   a tray; and
   a card holder, wherein
   the tray comprises: a first groove, configured to accommodate a first digital memory card; and a second groove, disposed perpendicular to the first groove and configured to accommodate a second digital memory card, wherein the first groove and the second groove have hollowed portions that partially overlap; and
   the card holder comprises: a first spring and a second spring, wherein when the tray is inserted into the card holder, the first spring and the second spring extrude from the hollowed portions; when the first digital memory card is accommodated in the first groove, the first spring is in contact with a metal contact of the first digital memory card; and when the second digital memory card is accommodated in the second groove, the second spring is in contact with a metal contact of the second digital memory card.

2. The apparatus according to claim 1, wherein the tray further comprises an insert end and an outer end; the card holder further comprises an insert plane, and is configured to insert the insert end of the tray into the card holder from the insert plane; and when the tray is accommodated in the card holder, the outer end overlapped with the insert plane.

3. The apparatus according to claim 2, wherein the tray further comprises a step structure, which is disposed on a tray side between the first groove and the insert end.

4. The apparatus according to claim 2, wherein there are multiple second springs, which are perpendicular to a direction of the insert end of the tray and arranged on a peer end of the insert plane in a single-sided manner.

5. The apparatus according to claim 4, wherein the second spring comprises a second fastening spring pin, which is configured to fasten the second spring on the card holder and is welded with an external circuit board.

6. The apparatus according to claim 2, wherein there are multiple first springs, which are set between the second spring and the insert plane, are parallel to a direction in which the tray is inserted, and are symmetrically arranged on two sides of the card holder.

7. The apparatus according to claim 6, wherein the first spring comprises a first fastening spring pin, which is configured to fasten the first spring on the card holder and is welded with an external circuit board.

8. The apparatus according to claim 1, wherein the card holder further comprises a limit spring pin, and the tray further comprises tray limit; and when the tray is inserted into the card holder, the limit spring pin cooperates with the tray limit to fasten the tray on the card holder.

9. The apparatus according to claim 3, wherein the card holder further comprises a detection pin, which is disposed on one side of the second spring, corresponding to a position of the step structure, and is configured to detect whether the first digital memory card or the second digital memory card exists in the apparatus for fastening a digital memory card.

10. The apparatus according to claim 1, wherein the first digital memory card is a Nano SIM card, and the second digital memory card is a Micro SD card.

* * * * *